(12) United States Patent
Tseng

(10) Patent No.: US 8,632,329 B2
(45) Date of Patent: Jan. 21, 2014

(54) INJECTION MOLD HAVING AN ELASTIC MEMBER LOCATED BETWEEN A FASTENING MEMBER AND A MOLD CORE

(75) Inventor: Min-Tsang Tseng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 64 days.

(21) Appl. No.: 13/539,707

(22) Filed: Jul. 2, 2012

(65) Prior Publication Data

US 2013/0164406 A1 Jun. 27, 2013

(30) Foreign Application Priority Data

Dec. 23, 2011 (TW) .............................. 100148443 A

(51) Int. Cl.
*B29C 45/10* (2006.01)
(52) U.S. Cl.
USPC .......................................... 425/185; 425/190

(58) Field of Classification Search
USPC ...................................... 425/185, 190, 192 R
See application file for complete search history.

(56) References Cited

U.S. PATENT DOCUMENTS

| 4,861,254 | A  | * | 8/1989  | Takeuchi et al. | 425/190 |
|-----------|----|---|---------|-----------------|---------|
| 7,828,542 | B2 | * | 11/2010 | Bokich          | 425/190 |
| 8,297,963 | B2 | * | 10/2012 | Yang            | 425/185 |
| 2006/0286196 | A1 | * | 12/2006 | Chien        | 425/468 |
| 2007/0122514 | A1 | * | 5/2007  | Tsai          | 425/190 |

* cited by examiner

*Primary Examiner* — Tim Heitbrink
(74) *Attorney, Agent, or Firm* — Altis Law Group, Inc.

(57) ABSTRACT

An injection mold includes a first mold base, a first mold core, a second mold base, a fastening member, a second mold core and at least one elastic member. The first mold core is fixed to the first mold base, and the fastening member is fixed to the second mold base. The second mold core is movably mounted on the second mold base for engaging with the first mold core to fabricate a workpiece. The at least one elastic member acts as a shock absorber between the fastening member and the second mold core.

19 Claims, 5 Drawing Sheets

INJECTION MOLD HAVING AN ELASTIC MEMBER LOCATED BETWEEN A FASTENING MEMBER AND A MOLD CORE

BACKGROUND

1. Technical Field

The present disclosure generally relates to molds, and particularly to an injection mold.

2. Description of Related Art

An injection mold is employed to fabricate parts from thermoplastic or thermosetting materials. The injection mold includes a first mold base, a first mold core, a second mold base and a second mold core. The first mold core is fixed to the first mold base, and the second mold core is fixed to the second mold. When in use, the second mold core abuts against the first mold core to mold a workpiece; the second mold core moves away from the first mold core to open the injection mold. In the above-described process, the first and second mold cores may be damaged easily, and need to be substituted or replaced frequently.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
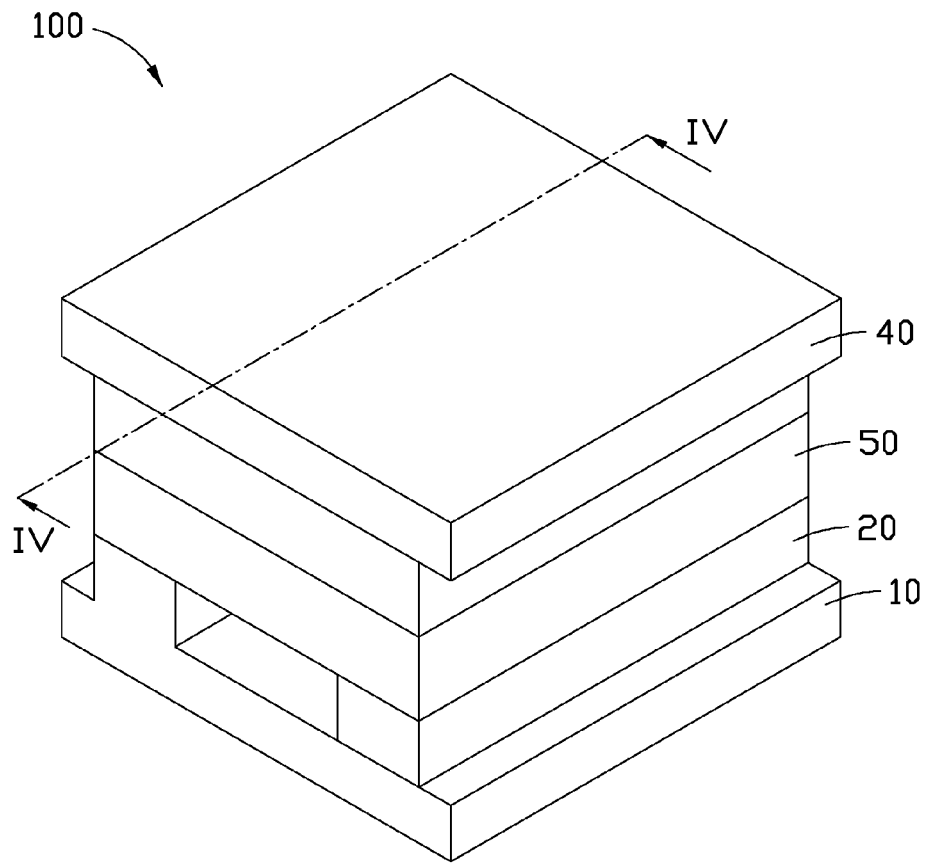
FIG. 1 is an isometric, assembled view of an embodiment of an injection mold.
Figure 2:
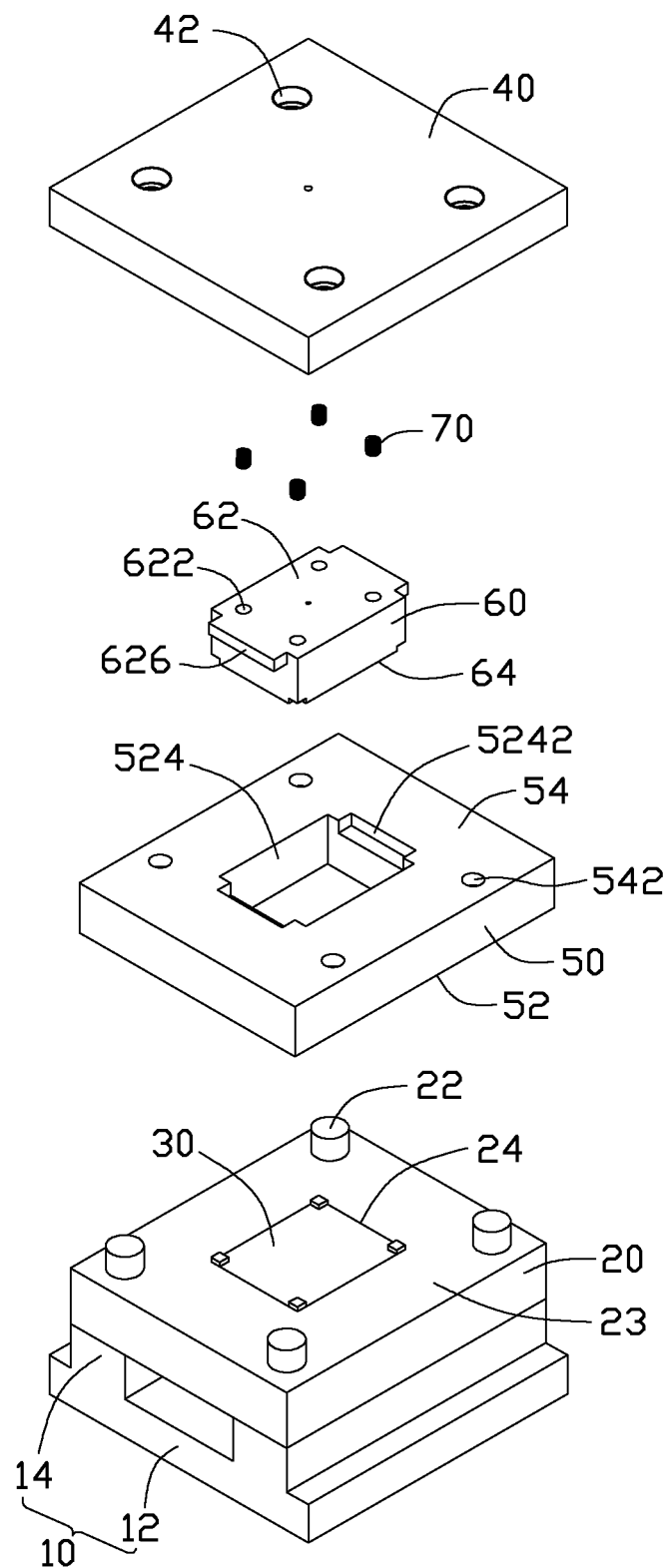
FIG. 2 is an exploded, isometric view of the injection mold of FIG. 1.
Figure 3:
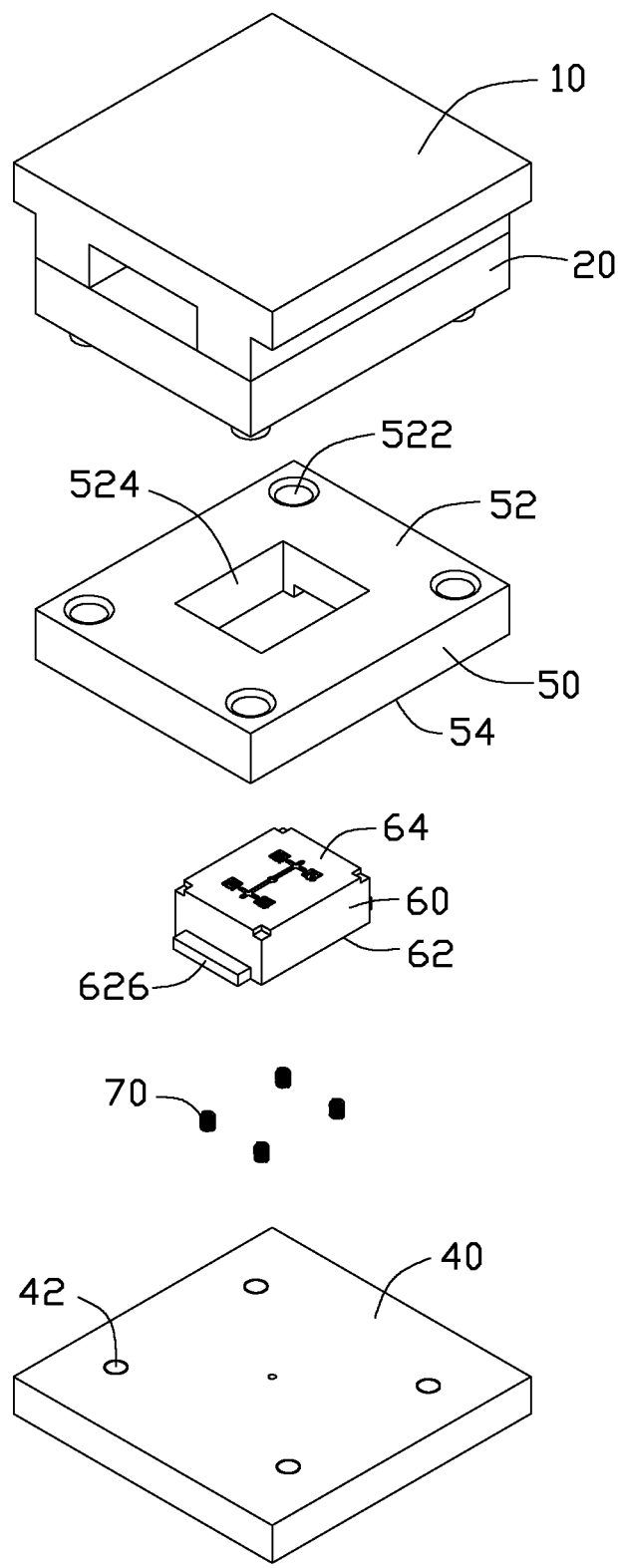
FIG. 3 is similar to FIG. 2, but viewed from another aspect.

FIGS. 1 through 3, show an embodiment of an injection mold 100 used in an injection molding machine for fabricating parts made from thermoplastic or thermosetting materials. The injection mold 100 includes a supporting member 10, a first mold base 20, a first mold core 30, a fastening member 40, a second mold base 50, a second mold core 60 and four elastic members 70. The first mold base 20 is fastened on the supporting member 10, the first mold core 30 is fastened to the first mold base 20. The second mold base 50 is fastened on the fastening member 40, the second mold core 60 is sandwiched between the fastening member 40 and the second mold base 50. The four elastic members 70 are contained between the second mold core 60 and the fastening member 40.

The supporting member 10 includes a base board 12 and a pair of fastening portions 14 formed on the base board 12. In the illustrated embodiment, the base board 12 is a substantially rectangular board. The pair of fastening portions 14 are at opposite ends of a surface of the base board 12 and parallel to each other.

The first mold base 20 is a substantially rectangular board, and is fastened to the pair of fastening portions 14 of the supporting member 10. The first mold base 20 includes a resisting surface 23 and four locating posts 22 on the resisting surface 23. The resisting surface 23 is an upper surface of the first mold base 20 opposite to the supporting member 10, the four locating posts 22 are at the four corners of the resisting surface 23. The first mold base 20 further defines a first receiving cavity 24 at a middle portion of the resisting surface 23 for receiving the first mold core 30. In the illustrated embodiment, the first mold core 30 is a rectangular block with a pattern of grooves, and the first receiving cavity 24 is a rectangular groove configured for receiving the first mold core 30.

The fastening member 40 is a substantially rectangular board, and defines four fastening holes 42 at the four corners thereof. The second mold base 50 is a substantially rectangular board, which includes a first supporting surface 52 and a second supporting surface 54 opposite to the first supporting surface 52. The first supporting surface 52 defines four locating holes 522 at the four corners thereof and a second receiving cavity 524 in the middle portion thereof. The four locating holes 522 correspond to the four locating posts 22 of the first mold base 20, and the second receiving cavity 524 is configured for receiving the second mold core 60. The second supporting surface 54 defines four fastening holes 542 corresponding to the four fastening holes 42 of the fastening member 40. The second receiving cavity 524 is a rectangular through hole, and includes a pair of stepped grooves 5242 recessed from opposite sidewalls of the second receiving cavity 524.

Figure 4:
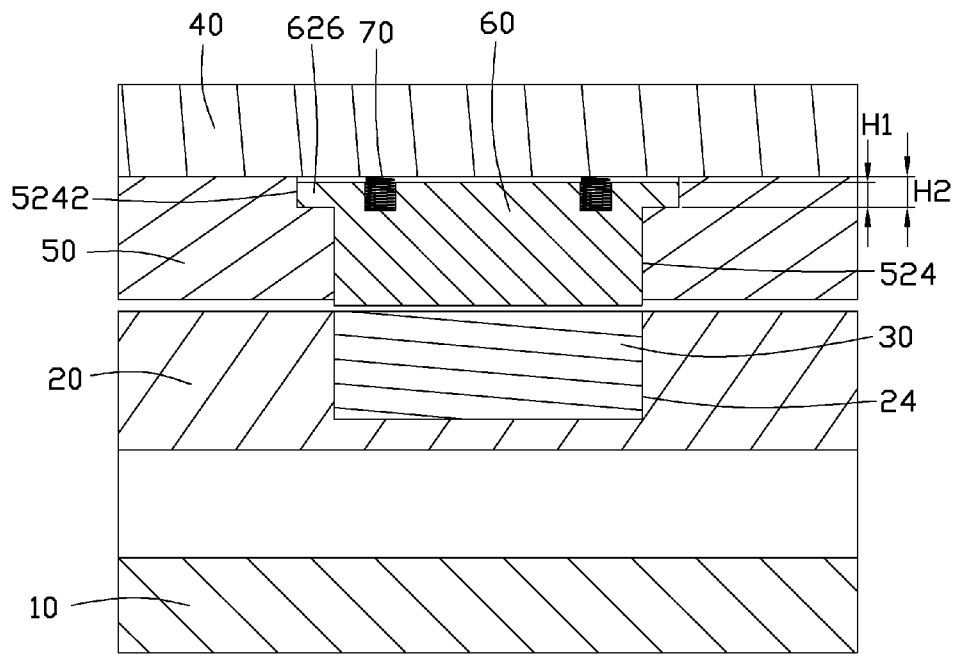
FIG. 4 is a cross-sectional view of the injection mold of FIG. 1 before closing the mold, taken along line IV-IV.
Figure 5:
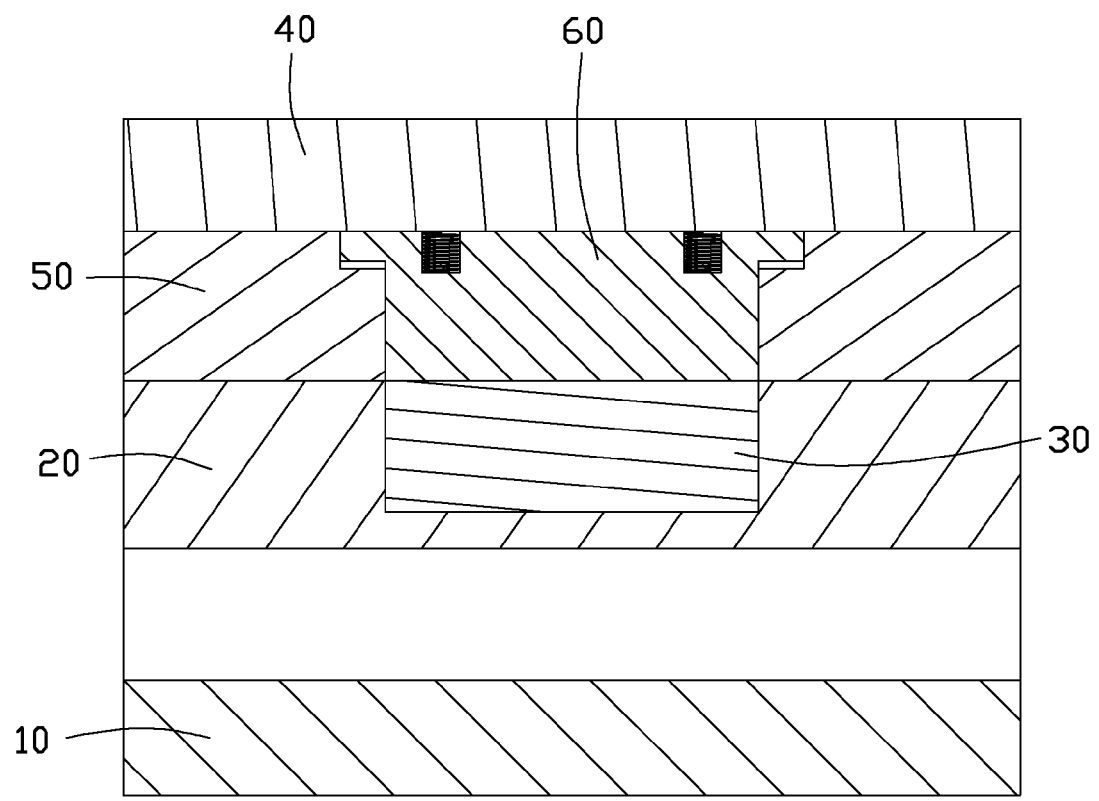
FIG. 5 is a cross-sectional view of the injection mold of FIG. 1 after closing the mold, taken along line IV-IV.

Referring to FIGS. 4 and 5, the second mold core 60 is received in the second receiving cavity 524, and includes a top surface 62 and a bottom surface 64. A height of the second mold core 60 is the same as a depth of the second receiving cavity 524. The second mold core 60 defines four containing holes 622 on the top surface 62 at the four corners of the second mold core 60, and further includes a pair of supporting portions 626 perpendicularly extending out from opposite ends of the second mold core 60. Each of the pair of supporting portions 626 is received in a stepped groove 5242. A height $H_1$ of each of the supporting portions 626 is less than a depth $H_2$ of each of the stepped grooves 5242. Each of the four elastic members 70 is partly received in one containing hole 622.

In alternative embodiments, the number of the elastic members 70 can be one, or two, or three or more, and the number of the containing holes 622 for receiving the elastic members 70 changes accordingly.

In alternative embodiments, the fastening member 40 may define four positioning holes (not shown) at a surface thereof facing the second mold core 60 corresponding to the containing holes 622 to receive the elastic members 70.

In assembly, the supporting member 10 is fastened to a driving member. The first mold base 20 is fixed to the supporting member 10, and the first mold core 30 is received in the first receiving cavity 24 of the first mold base 20. The second mold core 60 is received in the second receiving cavity 524 of the second mold base 50, and the second mold base 50 is fastened to the fastening member 40. An end of each of the four elastic members 70 is received in one containing hole 622, while the other end of each elastic member 70 elastically resists with the fastening member 40, such that the second mold core 60 is movably resisted between the second mold base 50 and the fastening member 40. The second mold core 60 protrudes out of the second receiving cavity 524 due to the urging force exerted by the elastic members 70 and the gravity of the second mold core 60. The height of the protruding portion of the second mold core 60 is equal to a difference in height between the depth $H_2$ of the stepped groove 5242 and the height $H_1$ of the supporting portion 626 (shown in FIG. 4).

In the mold closing process, the first mold base 20 is located below the second mold base 50 with the first mold core 30 aligned to the second mold core 60. The driving member drives the first mold core 30 to move towards the second mold core 60 until each of the four locating posts 22 is received in one locating hole 522. At this time, the first mold core 30 resists the second mold core 60 and drives the second mold core 60 to move towards the fastening member 40. When each of the four elastic members 70 is completely received in one containing hole 622 (shown in FIG. 5), the second mold core 60 makes contact with the fastening member 40. As the four elastic members 70 resist the second mold core 60 when the first mold core 30 moves towards the second mold core 60, any collisions or grinding between the first mold core 30 and the second mold core 60 are dampened or reduced, thereby avoiding damage to the first mold core 30 and the second mold core 60.

When unloading the injection mold 100, the driving member drives the first mold base 20 to move away from the second mold base 50. The second mold core 60 moves away from the fastening member 40 and abuts against the second mold base 50, such that the injection mold 100 is opened.

The second mold core 60 is movably received in the second mold base 50, and the four elastic members 70 are contained between the second mold core 60 and the fastening member 40, such that the elastic members 70 prevent the first mold core 30 and the second mold core 60 from collision damage when the injection mold 100 is closed. The four elastic members 70 push the second mold core 60 away from the fastening member 40 to enable the injection mold 100 to be opened easily.

The supporting member 10 may be omitted, and the first mold base 20 is connected to the driving member directly.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. An injection mold, comprising:
   a first mold base;
   a first mold core fixed to the first mold base;
   a second mold base;
   a fastening member fixed to the second mold base;
   a second mold core movably received in the second mold base for engaging with the first mold core to fabricate a workpiece; and
   at least one elastic member elastically resisted between the fastening member and the second mold core.

2. The injection mold of claim 1, wherein the first mold base comprises a resisting surface and a plurality of locating posts located on the resisting surface, the second mold base comprises a first supporting surface and defines a plurality of locating holes on the first supporting surface, the plurality of locating posts are received in the plurality of locating holes.

3. The injection mold of claim 2, wherein the first mold base further defines a first receiving cavity at a middle portion of the resisting surface, the plurality of locating posts are arranged around the first receiving cavity, and the first mold core is received in the first receiving cavity.

4. The injection mold of claim 2, wherein the second mold base defines a second receiving cavity on a middle portion thereof, the second receiving cavity comprises a pair of stepped grooves recessed from opposite sidewalls of the second receiving cavity, the second mold core comprises a pair of supporting portions perpendicularly extending from opposite ends of the second mold core outwardly, the second mold core is received in the second receiving cavity, the pair of supporting portions are received in the pair of stepped grooves respectively.

5. The injection mold of claim 4, wherein a height of the second mold core is equal to a depth of the second receiving cavity of the second mold base.

6. The injection mold of claim 5, wherein a height of each of the supporting portions is less than a depth of each of the pair of stepped grooves.

7. The injection mold of claim 1, wherein the second mold core defines at least one containing hole facing the fastening member, an end of the at least one elastic member is received in the containing hole, and the other end of the at least one elastic member resists the fastening member.

8. The injection mold of claim 7, wherein the at least one elastic members comprises four elastic members, the second mold core is substantially rectangular, the at least one containing hole comprises four containing holes located at four corners of the second mold core.

9. The injection mold of claim 1, wherein the second mold core defines at least one containing hole facing the fastening member, the fastening member defines at least one positioning hole corresponding to the at least one containing hole, the opposite ends of the at least one elastic member are received in the containing hole and the positioning hole respectively.

10. The injection mold of claim 1, further comprising a supporting member, wherein the supporting member comprises a base board and a pair of fastening portions formed on the base board, the first mold base is fastened to the pair of fastening portions of the supporting member.

11. An injection mold, comprising:
   a first mold base defining a first receiving cavity thereof;
   a first mold core received in the first receiving cavity;
   a second mold base defining a second receiving cavity thereof, wherein the second receiving cavity comprises a pair of stepped grooves recessed from opposite sidewalls of the second receiving cavity,
   a fastening member fixed to the second mold base;
   a second mold core comprising a pair of supporting portions perpendicularly extending from opposite ends thereof outwardly, wherein the second mold core is received in the second receiving cavity, the pair of supporting portions are received in the pair of stepped grooves respectively, a portion of the second mold core protrudes from the second receiving cavity; and
   at least one elastic member elastically resisted between the fastening member and the second mold core, wherein when the second mold core engages with the first mold core to fabricate a workpiece, the at least one elastic member is compressed and the second mold core is fully received in the second receiving cavity.

12. The injection mold of claim 11, wherein the first mold base comprises a resisting surface and a plurality of locating posts located on the resisting surface, the second mold base comprises a first supporting surface and defines a plurality of locating holes on the first supporting surface, the first receiving cavity of the first mold base is defined on the resisting surface, and the plurality of locating posts are received in the plurality of locating holes.

13. The injection mold of claim 12, wherein the first receiving cavity is located at a middle portion of the resisting surface, the plurality of locating posts are arranged around the first receiving cavity.

14. The injection mold of claim 12, wherein a height of the second mold core is equal to the depth of the second receiving cavity of the second mold base.

15. The injection mold of claim 14, wherein a height of each of the supporting portions is less than a depth of each of the pair of stepped grooves.

16. The injection mold of claim 11, wherein the second mold core defines at least one containing hole facing the fastening member, an end of the at least one elastic member is received in the containing hole, and the other end of the at least one elastic member resists the fastening member.

17. The injection mold of claim 16, wherein the at least one elastic member comprises four elastic members, the second mold core is substantially rectangular, the at least one containing hole comprises four containing holes located at four corners of the second mold core.

18. The injection mold of claim 11, wherein the second mold core defines at least one containing hole facing the fastening member, the fastening member defines at least one positioning hole corresponding to the at least one containing hole, the opposite ends of the at least one elastic member are received in the containing hole and the positioning hole respectively.

19. The injection mold of claim 11, further comprising a supporting member, wherein the supporting member comprises a base board and a pair of fastening portions formed on the base board, the first mold base is fastened to the a pair of fastening portions of the supporting member.

* * * * *